Oct. 7, 1924.
H. W. MORGAN
CULTIVATOR
Original Filed July 8, 1921   3 Sheets-Sheet 1
1,510,794
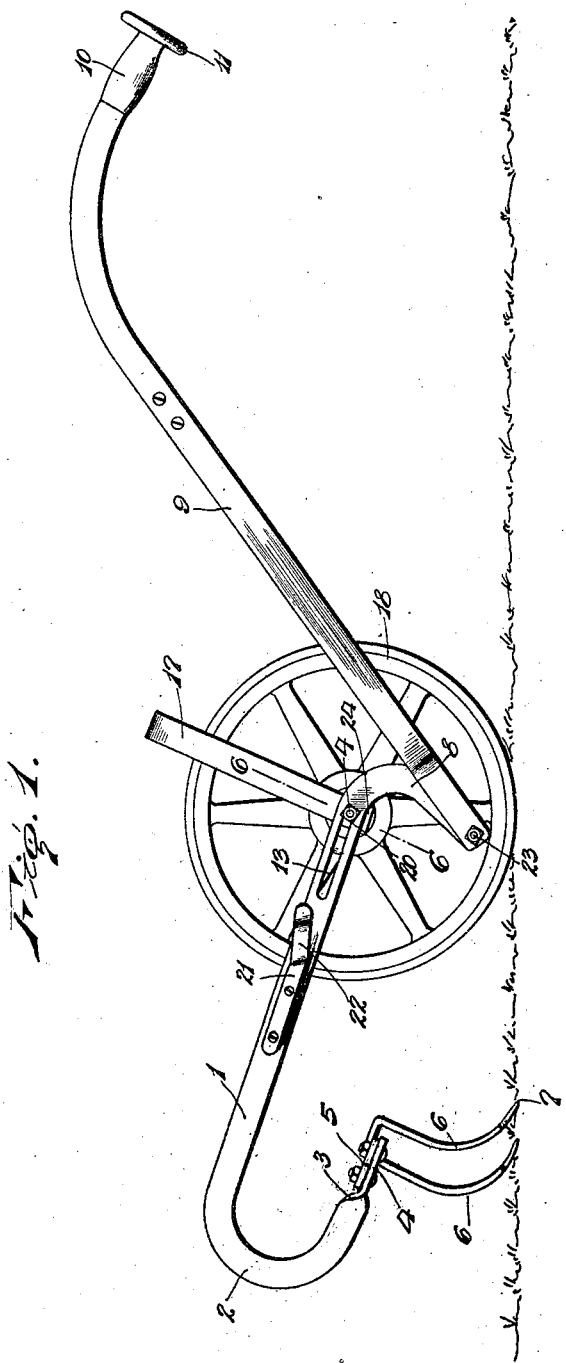
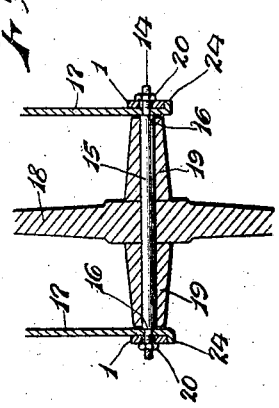
Inventor
H. W. Morgan.
By Lacey & Lacey, Attorneys Oct. 7, 1924.

H. W. MORGAN

CULTIVATOR

Original Filed July 8, 1921    3 Sheets-Sheet 2

1,510,794

Inventor
H. W. Morgan.

By
Lacey & Lacey, Attorneys

Oct. 7, 1924.

H. W. MORGAN 1,510,794

CULTIVATOR

Original Filed July 8, 1921    3 Sheets-Sheet 3

Inventor

H. W. Morgan

By Lacy & Lacy, Attorneys

Patented Oct. 7, 1924.

1,510,794

UNITED STATES PATENT OFFICE.

HENRY W. MORGAN, OF JOHNSON CITY, NEW YORK.

CULTIVATOR.

Application filed July 8, 1921, Serial No. 483,268. Renewed March 4, 1924.

*To all whom it may concern:*

Be it known that I, HENRY W. MORGAN, a citizen of the United States, residing at Johnson City, in the county of Broome and State of New York, have invented certain new and useful Improvements in Cultivators, of which the following is a specification.

This invention relates to cultivators and has special reference to garden cultivators of the type disclosed in Letters Patent, No. 1,342,642, granted to me June 8, 1920.

One object of the present invention is to provide means whereby the cultivator may be readily converted from a pull to a push cultivator, and another object of the invention is to provide means whereby the cultivator blades may be easily supported out of contact with the ground when it is desired to move the cultivator from field to field or over a paved walk. Another object of the invention is to provide an improved mounting for the wheel whereby the depth of penetration of the blades may be easily regulated. Other incidental objects of the invention will appear in the course of the following description.

My present improvements are illustrated in the accompanying drawings, in which—

Figure 1 is a side elevation of one embodiment of the invention showing the implement arranged to be pulled over the ground;

Fig. 6 is a detail section on the line 6—6 of Fig. 1.

Figure 2:
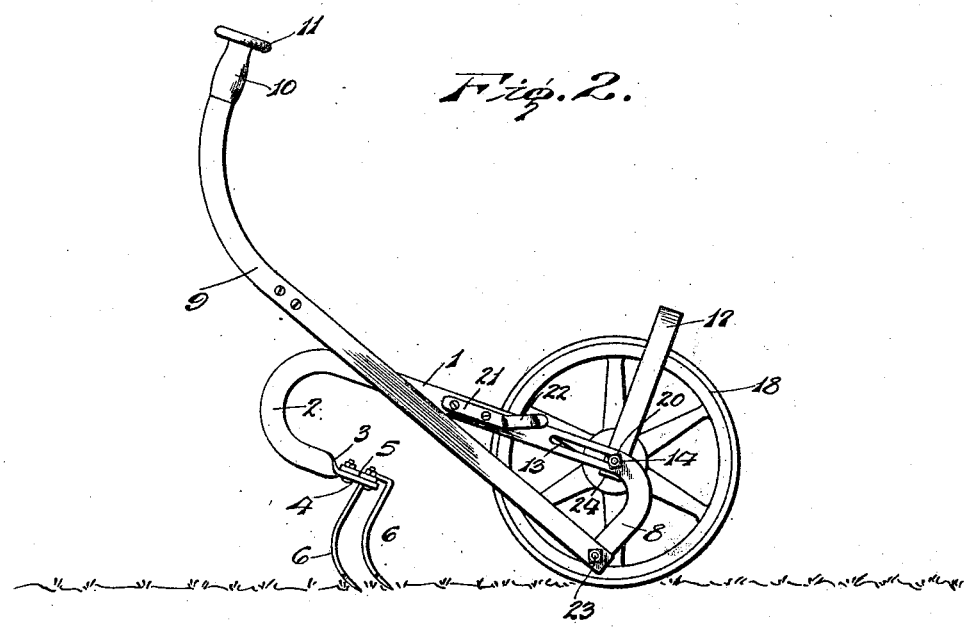
Fig. 2 is a side elevation showing the implement arranged to be pushed over the ground to be cultivated.

In carrying out my present invention, I employ a pair of parallel side beams 1 which have their rear ends bent downwardly and then forwardly, as shown at 2, and the extremities thereof are twisted, as shown at 3, whereby to present the flat faces of the beams in horizontal planes. Bolted to and extending between the flat extremities 4 of the side beams is a bar or head plate 5 to which are in turn bolted the ground-engaging implements 6. These blades or ground-engaging members may be of any desired formation, but are preferably tapered forwardly so as to provide points 7 which will readily penetrate the soil and it will be readily noted that in the illustrated arrangement all the ground-engaging members are disposed between the vertical planes of the side beams. This arrangement will generally be found preferable but obviously it may be varied.

Figure 4:
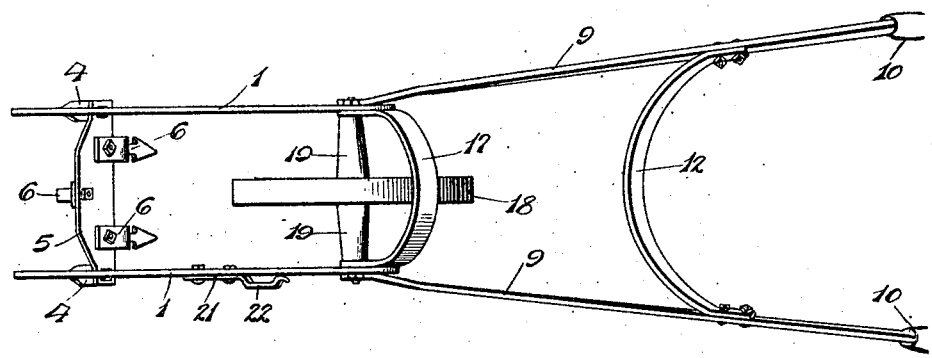
Fig. 4 is a plan view of the implement arranged to be pulled over the soil to be cultivated.
Figure 5:
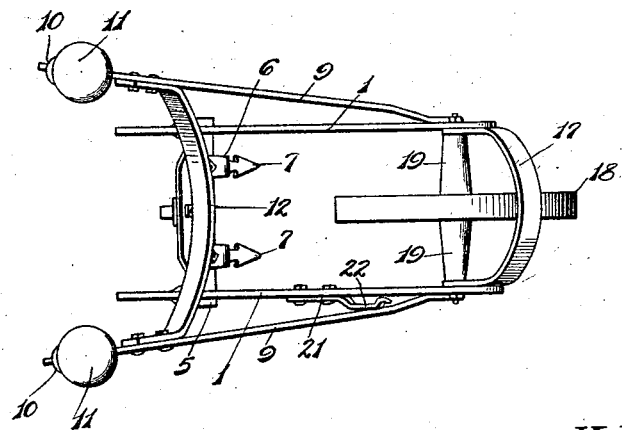
Fig. 5 is a similar view showing the implement arranged to be pushed over the ground to be cultivated.

The forward extremities of the side beams are turned downwardly and rearwardly, as indicated at 8, and to the lower extremities of these downwardly and rearwardly turned portions I pivotally secure the handles 9 which, as shown in Fig. 1, extend upwardly and forwardly and have their free ends equipped with hand grips 10, the diameters of which are greatest intermediate their ends and which are provided at their forward ends with circular heads 11. This design of hand grip is desirable inasmuch as it is comfortable to the hands of the operator and at the same time permits him to obtain a firm grip upon the handles. The handles are connected above their centers by a transverse curved brace 12 and, as shown in Figs. 4 and 5, the handles diverge upwardly so that the operator may readily assume a position between the handles.

The side beams 1 are provided with longitudinal slots 13 adjacent their downwardly turned portions 8 and the said slots receive the reduced ends 14 of an axle 15, this construction of the axle providing annular shoulders 16 adjacent their ends which are adapted to abut the inner sides of an arch 17 disposed between the side beams 1 and forming a brace for the same to maintain them in parallel spaced relation. A ground wheel 18 is mounted upon the axle 15 for free rotation thereon at the center thereof and spacing sleeves 19 are fitted upon the axle between the sides of the wheel and the respective ends of the bracing arch 17 whereby to prevent excessive lateral movement of the wheel. The combined length of the spacing sleeves 19 and the thickness of the hub portion of the wheel is less than the length of the axle between the shoulders 16 so that, when the securing nuts 20 are turned home against the sides of the arch 17 and the beams 1, the beams and the arch will be securely clamped against the shoulders 16, while the ground wheel will be permitted to freely rotate. It will be readily understood that the axle may be disposed at any point between the ends of the slots 13 and will, consequently, act as a fulcrum about which the beams will tend to turn when force is applied to the handles 9 so that the depth to which the blades 7 will penetrate the soil may be easily regulated by adjusting the axle longitudinally of the said slots 13.

Upon the outer side of one of the beams 1, I secure a resilient keeper or latch plate 21 which is constructed with an angular socket or jaw 22 at its free end adapted to engage one of the handles 9 in certain manipulations of the implement, as will presently appear.

Figure 3:
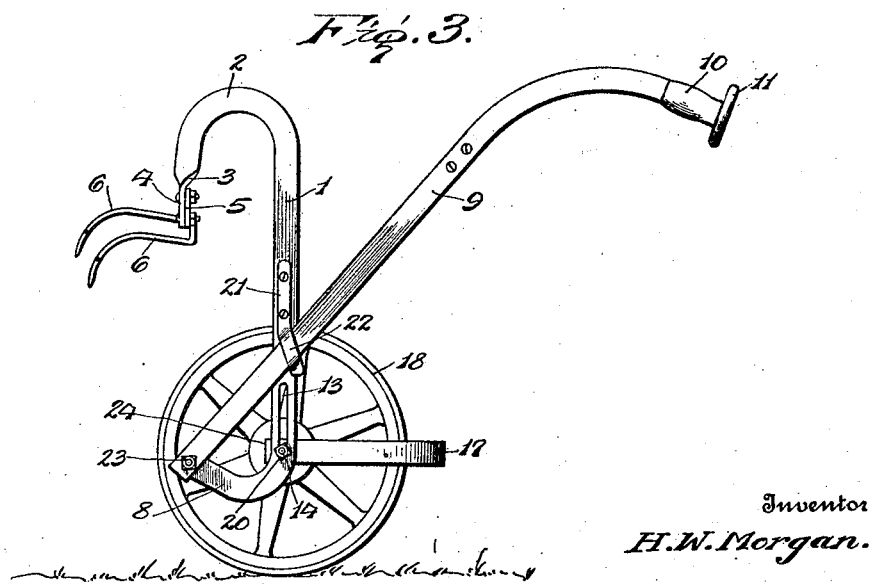
Fig. 3 is a similar view showing the manner of supporting the blades out of contact with the ground when the implement is to be moved from point to point over a walk or road.

When the device is arranged, as shown in Figure 1, the operator will assume a position between the free ends of the handles 9 and by walking forwardly and pulling upon the handles will draw the implement over the ground with the blades running below the surface of the soil. If it be preferred to operate the implement by pushing the same over the field, the handles are swung rearwardly about the bolts 23 which pivotally secure them to the front extremities of the side beams so that the handles will assume the position shown in Figs. 2 and 5 with the brace 12 resting upon the upper edges of the beams 1 over the ground-engaging members. The operator may now assume a position between the handles in rear of the blades or ground-engaging members and may propel the implement over the ground by pushing upon the handles. This arrangement will be found especially desirable when the soil is somewhat hard to break up as pressure may be exerted through the handle members and the brace 12 upon the side beams 1 to force the blades into the soil. It will, of course, be understood that when the handle members are swung to the position shown in Figs. 2 and 5, the free end of the resilient keeper 21 is pressed toward the adjacent beam 1 sufficiently to permit the handle to clear the keeper. If it be desired to move the implement from point to point while holding the blades out of contact with the ground the handles 9 are swung rearwardly about their pivots 23 without pressure being applied to the keeper. One handle member will thereupon ride into engagement with the keeper between the same and the adjacent side beam and if the handles be then pulled forwardly, the beams will be caused to move with the axle pivotally within the hub of the wheel and assume the position shown in Fig. 3, the ground-engaging members being held above the wheel and out of contact with the ground. The implement may then be pushed over improved roads or walks without damage to the same or to the soil penetrating blades and when the point of use has been reached, a slight pressure outwardly upon the free end of the keeper will release the same from the handles so that the implement may be again brought into an operative position.

It will be readily noted from the foregoing description, taken in connection with the accompanying drawings, that I have provided a very inexpensive, compact and easily manipulated implement which may be employed to cultivate the soil by either pushing or pulling upon the controlling handles and that the depth of penetration may be easily regulated. By mounting the axle of the ground wheel in longitudinal slots in the side beams, I am enabled to have the pivotal connection between the side beams and the handles at a fixed point, but users of the implement may prefer to have the axle at a fixed point in the beams and provide a plurality of openings in the downturned front extremities of the beams in any one of which the pivot bolt may be engaged to attach the handles. By locating the curved brace 12 at a point above the center of the handles, I am enabled to swing said brace clear of the arch 17 and bring the same into position to exert pressure upon the rear portion of the side beams and to relieve the strain upon the axle, I provide lateral lips 24 at the lower ends of the arch 17, which lips engage under the lower edges of the side beams and thereby prevent dropping of the side beams relative to the arch. This construction also tends to prevent bending of the reduced ends of the axle.

Having thus described the invention, what is claimed as new is:

1. In a cultivator, the combination of a pair of side beams, an axle secured transversely between the said beams near the front ends thereof, a ground wheel rotatably fitted upon said axle, ground-engaging members carried by the rear ends of the beams, a handle pivotally attached to the front extremity of one beam, and a resilient keeper carried by said beam and adapted to be engaged by said handle whereby the ground-engaging members may be swung to an inoperative position above the ground wheel.

2. In a cultivator, the combination of parallel side beams, ground-engaging members carried by the rear ends of said beams, handles pivoted to the front extremities of said beams, an arched brace disposed between the beams and provided at its lower ends with lateral lips engaging under the beams, an axle disposed between the beams and having its ends extending through the ends of the said arched brace and through the beams, the axle being provided with annular shoulders abutting the said arched brace, a ground wheel fitted rotatably upon the axle at the center thereof, and clamping means fitted upon the outer extremities of the axle and adapted to be turned home against the beams whereby to clamp the beams and the arched brace against the annular shoulders on the axle.

In testimony whereof I affix my signature.

HENRY W. MORGAN. [L. S.]